Sept. 30, 1952 V. C. GIORDANO 2,612,197
FRUIT PITTER
Filed Aug. 1, 1949 4 Sheets-Sheet 3

INVENTOR.
VINCENT C. GIORDANO
BY
Mellin + Hanscom
ATTORNEYS

Sept. 30, 1952     V. C. GIORDANO     2,612,197
FRUIT PITTER

Filed Aug. 1, 1949     4 Sheets-Sheet 4

INVENTOR.
VINCENT C. GIORDANO
BY
*Mellin + Hanson*
ATTORNEYS

Patented Sept. 30, 1952

2,612,197

UNITED STATES PATENT OFFICE 2,612,197

FRUIT PITTER

Vincent C. Giordano, Morgan Hill, Calif.

Application August 1, 1949, Serial No. 107,860

3 Claims. (Cl. 146—17)

This invention relates to and in general has for its object the provision of a turret type of pitter for pitting fruit such as prunes and dates.

More specifically the object of this invention is the provision of a fruit pitter including: a turret head; a number of symmetrically arranged, normally open fruit-holding chucks mounted on the turret head, said head being arranged to rotate step by step successively to a delivery station, a pitting station, a discharging zone and a steam cleaning station; cam actuated means located at said pitting station for contracting the jaws of said chucks in gripping engagement with said fruit for a predetermined interval and then retracting said jaws; a rotary tubular fruit trimmer and pit ejector located at said pitting station in axial alignment with the closed chuck and arranged to reciprocate therein, and a steam spray nozzle located at said cleaning station.

A further object of this invention is the provision in a pitter of the character above described of a pit ejector wiper located at said pitting station and serving to constrain the pitted fruit from moving out of the chuck as the ejector is making its return stroke.

Still another object of this invention is the provision of a new and improved fruit gripping chuck and pit ejecting assembly whereby the pits of prunes, dates, etc., can be expeditiously removed without impairing the flesh of the fruit.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings.

Frame

Figure 1:
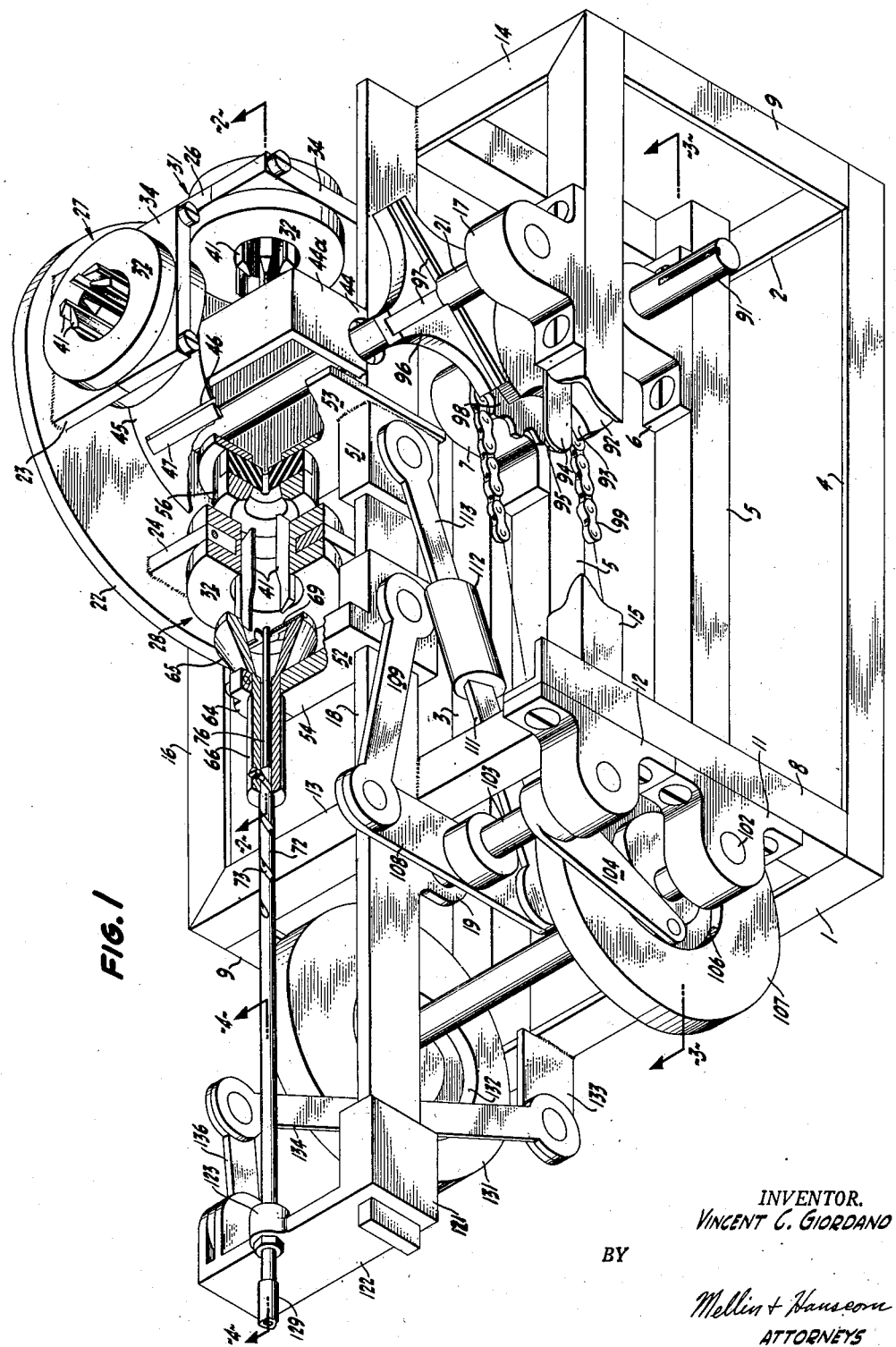
Fig. 1 is an isometric view of a prune pitter embodying the objects of my invention.

As shown in Fig. 1, the various assemblies, subassemblies and the driving mechanism forming part of my pitter are all mounted in a fabricated frame of rectangular form including lower opposed end members 1 and 2 and lower opposed side members 3 and 4. Extending between and welded to the end members 1 and 2 is a beam 5 and mounted on the right-hand ends of this beam and the side member 3 are bearings 6 and 7. Welded to the lower left-hand corner of the frame formed by the members 1, 2, 3 and 4 is an upstanding leg 8, and similarly welded to the other three corners of this frame are upstanding legs 9. Mounted on the leg 8 above the bearing 11 is a bearing 12. Welded to and across the upper ends of the legs 8 and 9 are opposed upper end members 13 and 14 and opposed upper side members 15 and 16. Mounted on the upper side members 15 and 16 are a pair of axially aligned bearings 17. Welded to the upper opposed end members 13 and 14 and overhanging the upper end member 13 is a slide rail 18 and formed integral with this rail is a depending bearing 19 in axial alignment with the bearing 12.

Turret head and chuck assembly

Figure 5:
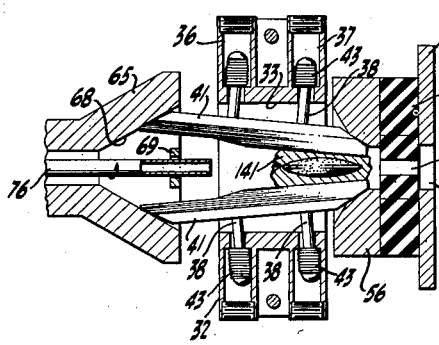
Fig. 5 is a mid-section of the chuck, jaw closing bells and tubular trimmer and pit ejector utilized in my pitter, the jaws being shown in their initial closing position over a prune.
Figure 7:
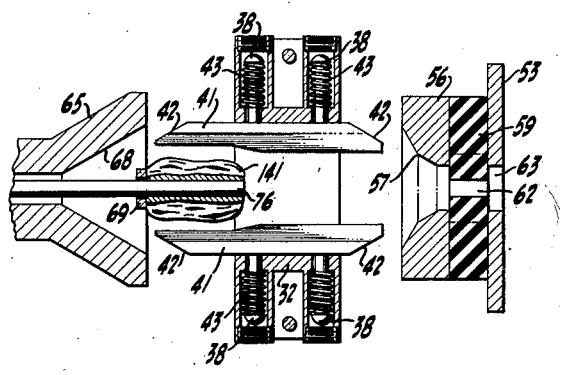
Fig. 7 is another view similar to Fig. 5 but showing the chuck, jaw closing bells and tubular ejector in their retracted position at the conclusion of the pitting operation.

Journalled in the opposed bearings 17 is a shaft 21 and fastened to this shaft adjacent its back end as viewed in Fig. 1 is a turret head 22 of disc form. Welded to the forward face of the turret head and extending forwardly thereof are four brackets 23, 24, 25 and 26, symmetrically disposed about the periphery of the turret head at 90° intervals. Receivable in a semicircular cut-out formed in each of these brackets are four chucks generally designated by the reference numerals 27, 28, 29 and 31. Each of these chucks includes a jaw carrier 32 of annular form and provided with a central channel 33 for the reception of its associated bracket and a mating clamp 34 fastened to its brackets by screws 35. Formed in each of the carriers 32 are six symmetrically disposed pairs of laterally aligned bores 36 and 37 and accommodated within each of these bores is a headed pin 38, the inner ends of these pins extending through holes 39 formed in the carrier. Symmetrically disposed within each carrier are six wedge shaped jaws 41 having tapered ends 42 and stepped inner edges, each of these jaws being threaded to or otherwise fastened to one of the pairs of pins 38 (see Fig. 2). Surrounding each of the pins 38 between its head and the floor of its associated bore is a spring 43 serving to hold the jaws 41 in their retracted and fully open position as illustrated in Fig. 7. As a result of this method of mounting the jaws 41, they are free to assume a longitudinally inclined position as shown in Fig. 5. Although the turret head 22 has been shown as provided with four chucks, it is to be understood that in so far as the principle of operation of the pitter is concerned, it would operate satisfactorily with a lesser or a greater number of chucks. Fastened to the slide rail 18 by a bifurcated foot 44 welded thereto and straddling the shaft 21 is a rearwardly extending bracket 44a, and welded to this bracket adjacent the inner face of the turret head 22 in an arcuate strap 45 underlying the locus of the chucks 27, 28, 29 and 31. The upper portion of this strap serves as a support for the prunes disposed within the open chucks as the chucks travel counter-clockwise from the delivery station to the pitting station. Formed in the strap immediately to the left of the bracket 44 is a slot 46 and secured to the strap immediately to the left of this notch and extending thereinto is a trimmer knife 47. The right end of the strap 45 terminates in a vertical portion 48 serving as a shield for preventing steam from passing to the left side of the machine. Welded to the strap 45 on the right-hand end thereof as viewed in Fig. 2 is an extension 49 serving to deflect ejected pits over the left-hand side of the lowermost chuck.

The twelve o'clock position of each of the four chucks may be considered as the feed or delivery station of the pitter, its nine o'clock position, assuming the turret head to rotate in a counter-clockwise direction, as the pitting station of the pitter, its six o'clock position as the terminal discharge zone of the pitter, and its three o'clock position as the steam cleaning station of the pitter.

Figure 2:
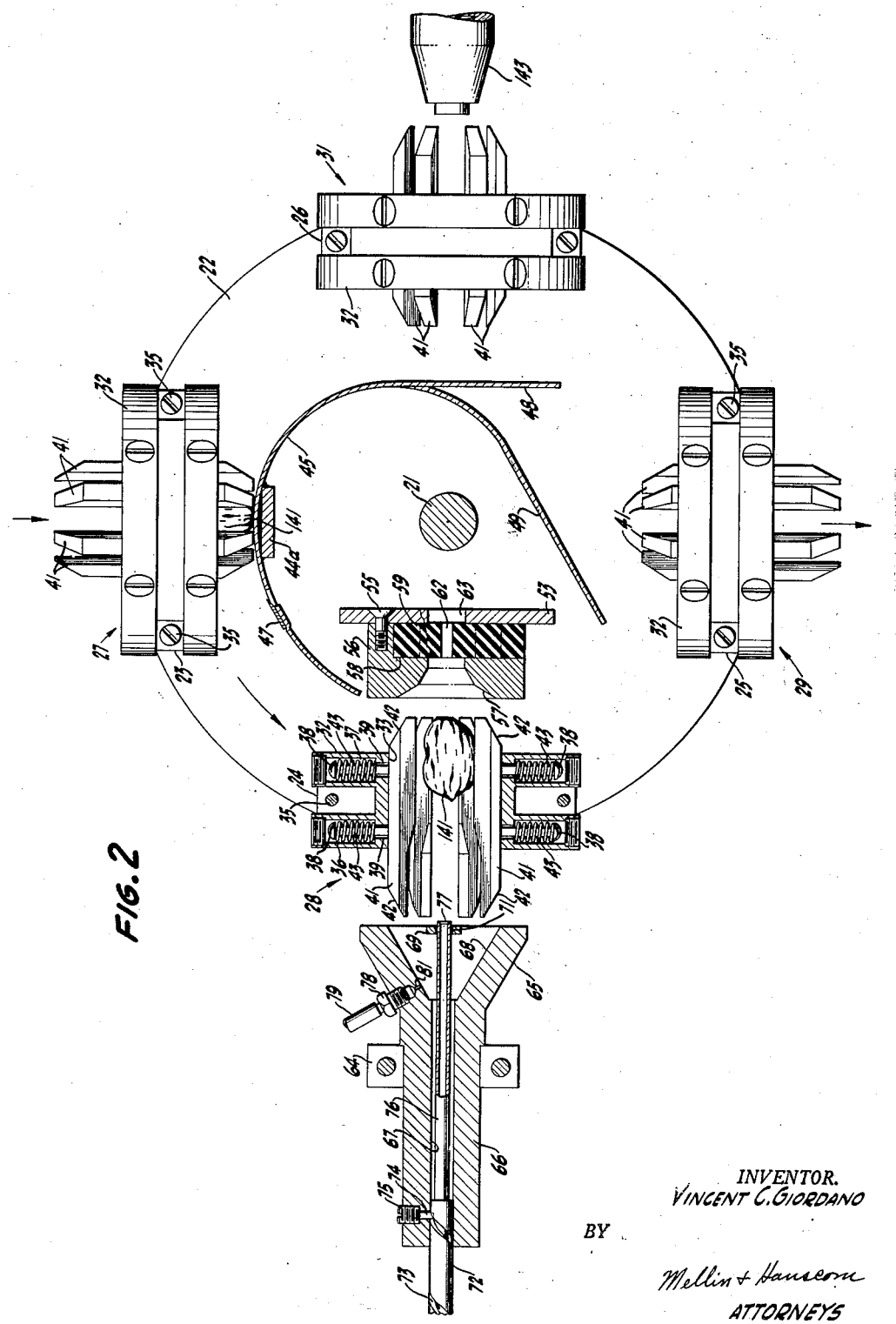
Fig. 2 is a vertical section taken on the section line 2—2 of Fig. 1.
Figure 6:
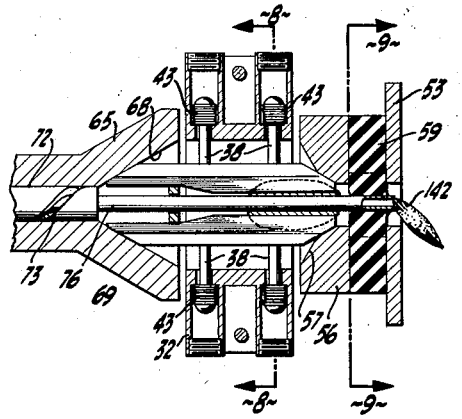
Fig. 6 is a view similar to that shown in Fig. 5, but with the parts of the device in the position assumed thereby just after the fruit pit has been ejected and with the ejector tube about to start its return stroke.

Mounted on the slide rail 18 are slides 51 and 52, respectively carrying brackets 53 and 54, these brackets being arranged to straddle the locus of travel on the chucks at the pitting station as illustrated in Figs. 1 and 2. Fastened to the bracket 53 by screws 55 is an inboard bell 56 formed on its outer face with a stepped conical recess 57 and on its inner face with a cross-shaped recess 58. Disposed in the recess 58 is a resilient rubber insert 59 formed as shown in Fig. 6 with crossed cuts or slits 61 and with a central hole 62 in longitudinal registration with a hole 63 formed in the bracket 53. Fastened to the outboard bracket 54 by a clamp 64 is a conical bell 65 having an outwardly extending neck 66 formed with a central bore 67 in axial alignment with the hole 63 formed in the bracket 53 and in axial alignment with that chuck positioned at the pitting zone. The bell 65 is provided with an inwardly diverging conical surface 68 and mounted on and extending across the bell is a narrow strap 69 having an enlarged central portion provided with an opening 71. Journalled in the bore 67 is a shaft 72 formed with a helical groove 73, this groove being arranged to receive the lower end of a pin 74 carried by a screw 75 threaded into the outer end of the bell neck 66. As a result of this construction, any longitudinal movement of the shaft 72 relative to the bell 65 will be accompanied by a rotary motion. Welded to the inner end of the shaft 72 is a tubular pit ejector 76, the free end of which is provided with a cutting edge 77 and extends through the opening 71. As will be presently more fully described, means are provided for moving the two bells 56 and 65 towards and away from each other. As the two bells move towards each other, their inner inclined surfaces engage the inclined ends 42 of the jaws 41 thereby to contract the jaws upon the fruit contained therein in a manner such as shown in Figs. 2, 5, 6, 7 and 8. Mounted in the outboard bell 65 is a nipple 78 arranged to be connected through a hose section 79 with a source of water and having an outlet opening 81 disposed over the pit ejector tube 76.

*Driving mechanism*

Journalled in the bearings 6 and 7 is a drive shaft 91 arranged to be connected through a suitable gear reducer to an electric motor.

Keyed to the drive shaft 91 is a Geneva drive wheel 92 formed with an arcuate cutout 93. Fastened to this drive wheel is a lever 94 and mounted on the end thereof is a roller 95. Keyed or otherwise fastened to the shaft 21 is a Geneva wheel 96 provided with four radial slots 97 located 90° apart. As shown in Fig. 1, during the lost motion cycle between the drive wheel 92 and the Geneva wheel 96, two of the forks of the Geneva wheel straddle the drive wheel 92 and thereby prevent the Geneva wheel from rotating during this portion of the cycle. The drive wheel 92 rotates in a clockwise direction and periodically the roller 95 is engaged in one of the slots 97 with the result that the Geneva wheel 96 and the shaft 21 are made to rotate through 90° during each complete revolution of the drive wheel 92. This intermittent step by step rotation of the shaft 21 is transmitted to the turret head 22, thereby causing the chucks mounted thereon to travel step by step successively to the delivery station, the pitting station, the discharging zone, and the steam washing station, all as previously indicated, and to momentarily hesitate at each one of these positions.

Figure 3:
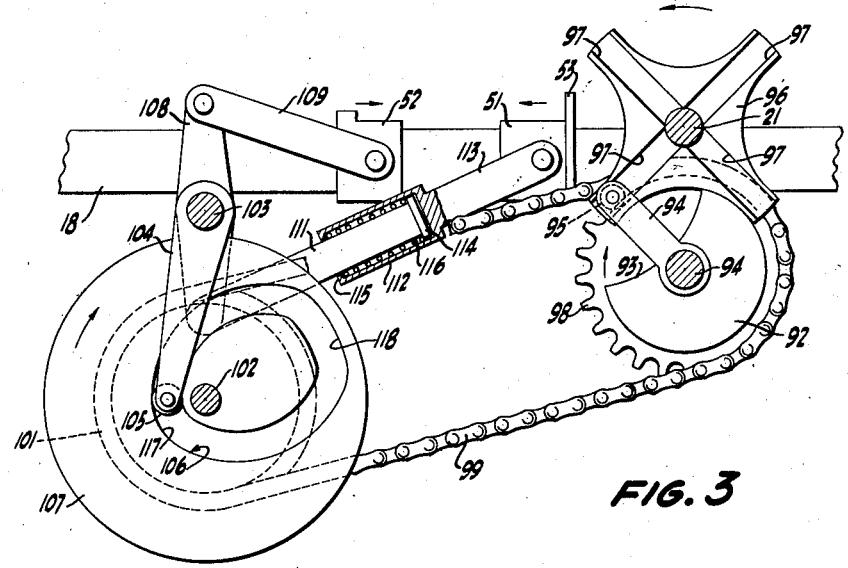
Fig. 3 is a vertical section taken on the section line 3—3 of Fig. 1.

Keyed to the drive shaft 91 is a sprocket wheel 98 which through a chain 99 serves to drive a sprocket wheel 101 (see Fig. 3). The sprocket wheel 101 is keyed or otherwise fastened to a shaft 102 journalled in the bearing 11 and in an axially aligned and similar bearing mounted on the leg 9 located at the upper left-hand end of the frame as viewed in Fig. 1. Journalled in the bearings 12 and 19 is a shaft 103 and keyed to this shaft is a lever 104 provided at its free end with a cam follower roller 105. Cam roller 105 is receivable in a cam track 106 formed in a cam disc 107 keyed to the shaft 102. Keyed to the shaft 103 is a rocker arm 108 and pivoted to the upper end thereof is a crank 109 the forward or right-hand end thereof as viewed in Fig. 1 being pivoted to the slide 52. Pivoted to the lower end of the rocker arm 108 is a crank section 111 the forward or right-hand end thereof as viewed in Fig. 3, being telescopically disposed in a sleeve 112. Formed integral with the sleeve 112 and as an extension thereof is a crank section 113 the free end of which is pivoted to the slide 51. Disposed within the sleeve 112 about the section 111 and in engagement at one end with a head 114 formed on the end of the section 111 and at its other end with a flange 115 formed on the free end of the sleeve, is a coil spring 116. As a result of this construction the slides 51 and 52 and their associated bells 56 and 65 are made to move towards and away from each other periodically in a cycle determined by the configuration of the cam track 106. From an inspection of Fig. 3 it is to be noted that the cam track 106 is provided with a circular portion 117 formed on a radius having its center on the axis of the shaft 102, and with an opposed circular portion 118 formed on a radius likewise having its center on the axis of the shaft 102. The track portion 117 subtends an angle about equal to 90°, and consequently (see Fig. 3) as the cam disc 107 turns in a clockwise direction through an angle of 90° the bells 56 and 65 will remain stationary. In the position of these members as shown in Fig. 3, the slides 51 and 52 have just reached their fully opened or expanded position with the starting portion of the circular cam track portion 117 in contact with the roller 105. As the cam disc 107 continues to rotate in a clockwise direction, there will be no further relative movement of the slides 51 and 52 until the track portion 117 has passed by the roller 105. When this has been effected, the continued movement of the cam track will force the roller 105 to the left as viewed in Fig. 3, thereby causing the slides 51 and 52 and their associated bells 56 and 65 to approach each other so as to assume their fully closed positions with the jaws of the chuck in their contracted or closed position over the fruit as viewed in Fig. 8. The initial portion of the circular cam track portion 118 then engages the roller 105 and since the portion 118 is formed on a constant radius the slides 51 and 52 will again be stationary for an interval of time determined by the angle subtended by the track portion 118. During this portion of the cycle of operation the jaws 41 are in their fully open position as required when the chuck leaves the pitting station and remain open during the entire remainder of the complete cycle of operation of the pitter.

Mounted on the left-hand end of the slide rail 18 as viewed in Fig. 1 is a slide 121 formed integral with a bracket 122. Formed on the bracket 122 is a boss 123 provided on one side with a threaded opening 124 and on its other side with a recess 125. Journalled in the recess 125 is the flanged outer end 126 of the shaft 72, a lock ring 127 being inserted within the recess 125 behind the flanged end of the rod 72 for the purpose of holding it in place. Threaded in the opening 124 is a fitting 128 and secured thereto is a section 129 of flexible hosing arranged to communicate with a suitable source of air under pressure. Mounted on the shaft 102 is a cam disc 131 formed with a closed cam track 132 of a configuration best shown in Fig. 4. Welded to the lower left-hand end frame member 1 is a bracket 133 and pivoted thereto is a lever 134. Mounted on this lever intermediate its ends is a cam track follower roller 135 receivable in the cam track 132. The upper end of the lever 134 is pivoted to a link 136 which in turn and as best shown in Fig. 1 is pivoted to the bracket 122. As a result of this construction, rotation of the cam disc 131 will cause the shaft 72 and its associated pit ejector tube 76 to rotate and reciprocate under the control of the cam track 132.

Figure 4:
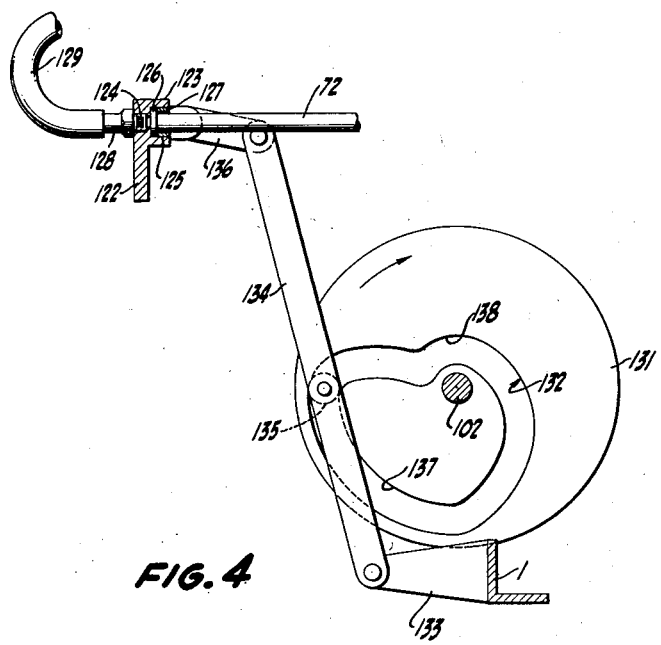
Fig. 4 is a vertical section taken on the section line 4—4 of Fig. 1.

From an inspection of Fig. 4 it is to be noted that the cam track 132 is provided with a portion 137 formed on a constant radius having its center on the axis of the shaft 102, this portion of the track subtending an angle of about 90°. Similarly, the track 132 is provided with a portion 138 of a constant radius having its center lying on the axis of the shaft 102, this portion also being subtended by an angle of substantially 90°. During the engagement of these portions of the cam track with the roller 135 the bracket 122 is stationary. During the intermediate portions of the cycle of operation of the cam disc 131 the shaft 72 is either moving to the right as viewed in Fig. 1 and simultaneously rotating or moving to the left out of the fruit and through the hole formed in the strap 69. The strap 69 serves to wipe the tubular member free and clear of any fruit flesh which may have adhered thereto.

From an inspection of Fig. 3 it is to be noted that although the slide 52 is reciprocated through a predetermined distance determined by the cam track 106, the final stage of the movement of the slide 51 towards the slide 52 proceeds under the restraining action of the spring 116, this spring and the telescopic crank sections 111 and 113 serving as a lost motion connection between the slide 51 and the cross bar 108.

*Operation*

Figure 8:
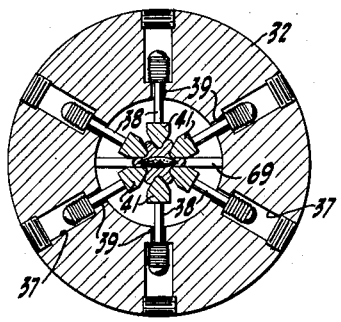
Fig. 8 is a section taken on the section line 8—8 of Fig. 6.
Figure 9:
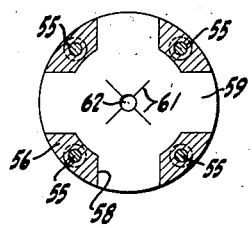
Fig. 9 is a section taken on the section line 9—9 of Fig. 6.

The operation of the pitter above described is as follows:

The four chucks rotate step by step through 90° arcs successively to the delivery, pitting, discharging, and steam cleaning stations of the pitter. The chuck at the delivery station is in its fully opened position, and in this position a prune, date or other fruit 141 to be pitted is inserted into the open upper ends of the chuck jaws, whereupon it falls to the lower end of the chuck, the lower end of the fruit then being supported on the upper face of the strap 45. Each of the chucks then advances to the next succeeding station. In passing from the delivery station to the pitting station, the lower tip end of the prune is trimmed off by the knife 47. Upon reaching the pitting station the chuck jaws are still in their fully open position with the prune located at the right-hand end of the chuck as illustrated in Fig. 2. At this point the bells 56 and 65 advance towards each other but with the bell 56 reaching the inner inclined ends of the chuck jaws in advance of the time at which the bell 65 reaches the outer inclined ends of the jaws. As a result of this action, the inner ends of the jaws are brought together over the prune as shown in Fig. 5. Following this, the further inward advance of the bell 65 serves to contract the outer ends of the chuck jaws, whereupon the jaws assume a position parallel to each other with their inner tapered edges embedded in the prune as shown in Figs. 6 and 8. Concurrently with this movement the tubular cutter and ejector 71 are advancing towards the prune. Simultaneously the ejector is rotating and upon reaching the prune cuts through its skin. During the final forward movement of the tubular ejector the inner end of the prune is supported by the cross shaped rubber insert 59, and the ejector forces the pit 142 through the flesh of the fruit and through the insert 59. In this position of the chuck the strap 69 passes between two pairs of adjacent chuck jaws with its central portion located within the stepped rear portions of the jaws as shown in Fig. 6. The ejected pit falls by gravity along the inner face of the bracket 53 and onto the lower end of the deflector plate or chute 49 and then downwardly past the left-hand end of the lowermost chuck as viewed in Fig. 2 and into any suitable container disposed in vertical alignment therewith. If during the return stroke of the ejector any fruit flesh adheres thereto, it will be wiped off by the strap 69 as illustrated in Fig. 7. During the pitting operation water dripping from the fitting 78 lubricates the ejector and serves to loosen any flesh adhering thereto.

Upon completion of the pitting cycle each of the four chucks is advanced through another 90° into its next succeeding position. Some time during this 90° travel the pitted prune falls by gravity from the pitter into any suitable receptacle or endless conveyor located beneath the machine.

Located at the fourth or steam washing station of the pitter in axial alignment with the chuck at this station is a steam nozzle 143 connected to a suitable source of steam under pressure. The steam is ejected into and through the adjacent chuck to thoroughly clean and sterilize it and during this operation the deflector strap or shield 48 serves to prevent steam from reaching the prunes at the other stations, at least until such time as the steam has cooled and condensed.

I claim.

1. A fruit pitter comprising: a frame; a turret head journalled in said frame; a fruit holding chuck fixed to and extending outwardly from one face of said turret head, said chuck including a cylindrical collar having an axis transverse to and intersecting the axis of said turret head; a plurality of jaws disposed star fashion in said collar and having tapered ends extending through said collar, each of said jaws being mounted on pins extending radially through said collar with positive clearance and said jaws being biased outwardly by springs surrounding said pins; a pitting station located adjacent the path of travel of said chuck; a pair of coaxial, axially spaced conical jaw actuators mounted on said frame at said pitting station and straddling the path of travel of said chuck; a tubular pit ejector mounted on said frame coaxially with said jaw actuators and arranged to reciprocate therethrough; a Geneva wheel mounted on said frame in association with said turret head for periodically rotating said turret head to periodically position said chuck at said pitting station; first cam controlled drive means mounted on said frame for advancing said conical jaw actuators toward each other and against the tapered ends of the clutch jaws to thereby close said jaws and for then retracting said actuators to permit said jaws to open under the influence of said springs; and second cam controlled drive means mounted on said frame in association with said tubular ejector for advancing said ejector through said chuck and then retracting said ejector.

2. A fruit pitter comprising: a frame; a turret head journalled in said frame; a fruit holding chuck fixed to and extending outwardly from one face of said turret head, said chuck including a cylindrical collar having an axis transverse to and intersecting the axis of said turret head; a plurality of jaws disposed star fashion in said collar and having tapered ends extending through said collar, each of said jaws being mounted on pins extending radially through said collar with positive clearance and said jaws being biased outwardly by springs surrounding said pins; a pitting station located adjacent the path of travel of said chuck; inner and outer coaxial, axially spaced conical jaw actuators mounted on said frame at said pitting station and straddling the path of travel of said chuck, said inner jaw actuator being provided on its rear end with an elastomer insert formed with a small central hole and which serves as a fruit stop; a tubular pit ejector mounted on said frame coaxially with said jaw actuators and arranged to reciprocate therethrough; a Geneva wheel mounted on said frame in association with said turret head for periodically rotating said turret head to periodically position said chuck at said pitting station; first cam controlled drive means mounted on said frame for advancing said conical jaw actuators toward each other and against the tapered ends of the clutch jaws to thereby close said jaws and for then retracting said actuators to permit said jaws to open under the influence of said springs; and second cam controlled drive means mounted on said frame in association with said tubular ejector for advancing said ejector through said chuck and then retracting said ejector.

3. A fruit pitter comprising: a frame; a turret head journalled in said frame; a fruit holding chuck fixed to and extending outwardly from one face of said turret head, said chuck including a cylindrical collar having an axis transverse to and intersecting the axis of said turret head; a plurality of jaws disposed star fashion in said collar and having tapered ends extending through said collar, each of said jaws being mounted on pins extending radially through said collar with positive clearance and said jaws being biased outwardly by springs surrounding said pins; a pitting station located adjacent the path of travel of said chuck; inner and outer coaxial, axially spaced conical jaw actuators mounted on said frame at said pitting station and straddling the path of travel of said chuck, a strap being mounted across the inner face of said outer jaw actuator and provided with a central opening; a tubular pit ejector mounted on said frame coaxially with said jaw actuators and arranged to reciprocate therethrough and through the opening in said strap; a Geneva wheel mounted on said frame in association with said turret head for periodically rotating said turret head to periodically position said chuck at said pitting station; first cam controlled drive means mounted on said frame for advancing said conical jaw actuators toward each other and against the tapered ends of the clutch jaws to thereby close said jaws and for then retracting said actuators to permit said jaws to open under the influence of said springs; and second cam controlled drive means mounted on said frame in association with said tubular ejector for advancing said ejector through said chuck and then retracting said ejector.

VINCENT C. GIORDANO.

REFERENCES CITED

The following references are of record in the file of this patent:

UNITED STATES PATENTS

| Number | Name | Date |
| --- | --- | --- |
| 1,698,477 | Frova | Jan. 8, 1929 |
| 1,725,223 | Sturges | Aug. 20, 1929 |
| 1,924,678 | Curtiss | Aug. 29, 1933 |
| 1,940,276 | Smith | Dec. 19, 1933 |
| 2,059,163 | Wolff | Oct. 27, 1936 |
| 2,151,943 | Sievers | Mar. 28, 1939 |
| 2,485,653 | Peel | Oct. 25, 1949 |

FOREIGN PATENTS

| Number | Country | Date |
| --- | --- | --- |
| 54,152 | Austria | June 25, 1912 |